United States Patent
Roeglin et al.

(10) Patent No.: US 9,016,793 B2
(45) Date of Patent: Apr. 28, 2015

(54) ADJUSTABLE ARMREST DEVICE

(71) Applicant: Atwood Mobile Products, LLC, Elkhart, IN (US)

(72) Inventors: Tim Roeglin, Elkhart, IN (US); Hari Sunkara, Elkhart, IN (US)

(73) Assignee: Atwood Mobile Products, LLC, Elkhart, IN (US)

( * ) Notice: Subject to any disclaimer, the term of this patent is extended or adjusted under 35 U.S.C. 154(b) by 0 days.

(21) Appl. No.: 14/132,280

(22) Filed: Dec. 18, 2013

(65) Prior Publication Data

US 2014/0175850 A1  Jun. 26, 2014

Related U.S. Application Data

(60) Provisional application No. 61/745,135, filed on Dec. 21, 2012.

(51) Int. Cl.
*B60N 2/46* (2006.01)
*A47C 7/54* (2006.01)

(52) U.S. Cl.
CPC ............ *B60N 2/4633* (2013.01); *B60N 2/4606* (2013.01); *A47C 7/543* (2013.01)

(58) Field of Classification Search
CPC ............................ B60N 2/4606; B60N 2/4633
USPC ........................................ 297/411.32, 411.38
See application file for complete search history.

(56) References Cited

U.S. PATENT DOCUMENTS

| | | | |
|---|---|---|---|
| 3,304,107 A | 2/1967 | Bahmuller | |
| 3,779,655 A | 12/1973 | Toyota | |
| 4,244,623 A | 1/1981 | Hall et al. | |
| 4,621,864 A * | 11/1986 | Hill | 297/115 |
| 4,655,501 A | 4/1987 | Ishigami et al. | |
| 4,674,790 A | 6/1987 | Johnson | |
| 4,828,323 A * | 5/1989 | Brodersen et al. | 297/411.36 |
| 4,889,386 A | 12/1989 | Kochy et al. | |
| 4,978,171 A | 12/1990 | Tateyama | |
| 5,106,160 A * | 4/1992 | Nomura et al. | 297/411.32 |
| 5,397,168 A | 3/1995 | Hand | |
| 5,489,143 A | 2/1996 | Adachi et al. | |
| 5,597,209 A | 1/1997 | Bart et al. | |
| 5,622,408 A | 4/1997 | Yamada | |
| 5,702,157 A | 12/1997 | Hurite | |
| 5,735,577 A | 4/1998 | Lin | |
| 6,106,068 A | 8/2000 | Lefevere | |
| 6,382,726 B2 | 5/2002 | Bullesbach et al. | |

(Continued)

*Primary Examiner* — Peter Brown
(74) *Attorney, Agent, or Firm* — Michael A. Myers; Myers & Associates

(57) ABSTRACT

An adjustable armrest includes a housing with opposite walls. Each of the walls has a bore formed in it. The boxes support a pivot pin with a gear so that the armrest is pivotable on the pin. A ratchet with a pawl is pivotably connected to and carried by the armrest. The ratchet is also configured so that the pawl may engage the gear to define incremental ratcheting movement of the armrest on the pin when the armrest is pivoted in one direction. There is also provided a cam ring selectively movable with the armrest for rotational engagement with the gear. The cam ring has an exterior cam surface that contacts a portion of the ratchet and pivots the ratchet clear of engagement with the gear when the armrest is pivoted in another direction. The new armrest incorporates fewer components lowering cost of production, improving torsion force and load bearing capabilities, improving life of the furniture piece and strengthening armrest and furniture piece assembly.

10 Claims, 13 Drawing Sheets

(56) References Cited

U.S. PATENT DOCUMENTS

| | | |
|---|---|---|
| 6,467,847 B2 | 10/2002 | Bidare |
| 6,488,338 B1 | 12/2002 | Hoshihara |
| 6,533,353 B2 | 3/2003 | Johnston |
| 6,609,758 B1 | 8/2003 | Lefevere |
| 6,698,838 B2 | 3/2004 | Kain |
| 7,100,242 B2 | 9/2006 | Maierholzner |
| 7,284,799 B2 | 10/2007 | Chung |
| 7,384,102 B2 | 6/2008 | Chen et al. |
| 7,828,390 B2 | 11/2010 | Liu et al. |
| 7,857,393 B2 | 12/2010 | Cebula et al. |
| 7,980,631 B2 | 7/2011 | Diffrient |
| 8,702,174 B2 * | 4/2014 | Pacolt ............... 297/411.38 |
| 2003/0234554 A1 | 12/2003 | Maierholzner |
| 2007/0007811 A1* | 1/2007 | Chung ............... 297/411.38 |
| 2007/0241603 A1 | 10/2007 | Otto |
| 2008/0303335 A1* | 12/2008 | van de Ven et al. ...... 297/411.34 |
| 2009/0108660 A1 | 4/2009 | Weber et al. |
| 2011/0187175 A1 | 8/2011 | Faccin |

\* cited by examiner

ADJUSTABLE ARMREST DEVICE

REFERENCE TO RELATED APPLICATION

This application claims priority to Provisional Application No. 61/745,135 filed Dec. 21, 2012, which is hereby incorporated by reference.

BACKGROUND OF THE INVENTION

The present invention relates to furniture and, more particularly, to an adjustable armrest device. Furniture pieces, such as chairs, lounges, sofas and the like, often include armrests that are made to pivotably adjust relative to a back support/element. Armrests may be made to move from the vertical to the horizontal. This is often desirable in aircraft, vehicle, RV, watercraft and certain other applications where space is a commodity, that is, where passengers are made to move in and out and in between tight spaces where armrests tend to protrude. Thus, armrests do not just support an individual's arms while seated. An armrest also serves as a grab handle.

This feet cuts short substantially the lifecycle of armrests that are designed to be adjustable at points between the vertical and horizontal positions so as to provide optimum comfort for their reclining occupants, i.e., incrementally adjustable armrests. Their lifecycles are approximately 10,000 cycles. Conventional armrest devices that are adjustable incrementally cannot bear up under typical grab handle loads. Load bearing on the order of 1,400-1,600 Newton (N) horizontal and 2,300-2,500 N in the vertical range is required for proper and reliable operation. Conventional armrests tend to be complex in design and have too many moving parts. The parts connecting the armrest to the back and which facilitate incremental adjustment of the armrest relative to the back support bend, wear and eventually break.

Thus, it would be advantageous to provide an improved adjustable armrest device capable of meeting load requirements greater than 2,400 N (vertical force) and 1,500 N (horizontal force). When compared with existing units, such adjustable devices should be capable of being produced without adding to the weight or manufacturing cost of those now available. The device should have fewer moving parts for easy manufacture and assembly in high volume production. It is also desirable to provide an improved adjustable armrest having a longer useful life.

It is finally highly desirable to provide a new adjustable device for connecting an armrest to a furniture piece that incorporates fewer components lowering cost of production, improving torsion force and load bearing capabilities, improving life of the furniture piece and strengthening armrest and furniture piece assembly.

SUMMARY OF THE INVENTION

Therefore, it is an object of the invention to provide an improved adjustable armrest.

It is also an object of the invention to provide an improved adjustable armrest capable of meeting load requirements greater than 2,400 N (vertical force) and 1,500 N (horizontal force).

It is also an object of the invention to provide an improved adjustable armrest capable of being produced without adding to the weight or manufacturing cost of such devices currently available.

It is also an object of the invention to provide an improved adjustable armrest having fewer moving parts for easy manufacture and assembly in high volume applications.

It is finally an object of the invention to provide a new adjustable device for connecting an armrest to a furniture piece that incorporates fewer components lowering cost of production, improving torsion force and load bearing capabilities, improving life of the furniture piece and strengthening armrest and furniture piece assembly.

In the broader aspects of the invention, an adjustable armrest is provided that is especially useful for attaching to a back support member of a furniture piece. The novel armrest design enables the angle of the armrest relative to the back support element to be incrementally adjusted between an upper vertical position and a lower position while not adding to the weight or manufacturing cost. The armrest includes a housing with an inside and an outside bracket wall. Each of the walls has a bore formed there through. A pivot pin positioned in the housing is supported by each of the bores. A gear is positioned on the pin. The gear has teeth extending across its entire width to define detents. The gear includes an upper position stop and a lower position stop. There is a cam on the pivot pin with an interior surface for rotational engagement with the gear, and an exterior cam surface. A ratchet is carried by the armrest and has a pivot at one end, a tail with ratchet teeth at another end, and a central section between the two ends. The central section has a ledge for engagement with the exterior cam surface of the ring. The ratchet teeth extend across the entire width of the tail. A tension spring is included for constantly urging the tail of the ratchet in a direction toward engagement with the gear. The ratchet teeth engage the detents between the gear teeth in response to pivoting the armrest from the lower position in a direction toward the upper position to define movement of the armrest in increments of between two and ten degrees (2°-10°).

In another aspect of the invention, an adjustable connecting device is provided for connecting an armrest to a back support element of a furniture piece so that the angle of the armrest relative to the back support element may be incrementally adjusted between an upper position, which is beyond parallel (obliquely angled relative to the horizontal) with the hack support element, and a lower position, which is about horizontal. The connecting device includes a pivot pin with one end adapted to be connected to the back support element so the armrest is pivotable on the pin. A gear is positioned on the pin. The gear has a face with an upstanding portion and exterior teeth. A cam ring with an interior surface and an exterior cam surface is also positioned on the pin. A ratchet carried by the armrest has a cylinder portion at one end, a tail with teeth at another end, and a central section between the ends. The central section has a ledge for engagement with the exterior cam surface of the cam ring. A tension spring constantly urges the tail of the ratchet in a direction toward engagement with the gear.

In another aspect, the gear, cam ring, ratchet and tension spring are housed between brackets.

In another aspect, opposite sides of the gear each has a face with a respective upstanding portion so that a gear may be assembled into a right hand armrest or a left hand armrest.

In still another aspect, opposite sides of the central section of the ratchet each has a ledge for engagement with the exterior cam surface of a cam ring. The gear has an upper position stop and a lower position stop each extending outwardly from the gear.

In yet another aspect, the pin has an outside end and an inside end, and the gear is mounted to the outside end. The inside end of the pin has a cross bore formed at an angle with the horizontal of between twenty and twenty-five degrees (20°-25°).

The ratchet teeth engage detents between the gear teeth in response to pivoting the armrest from the lower position in a direction toward the upper position to define movement of the armrest in increments of between two and ten degrees (2°-10°).

BRIEF DESCRIPTION OF THE DRAWINGS

The above-mentioned and other features and objects of the invention and the manner of attaining them will become more apparent and the invention better understood by reference to the following description of an embodiment of the invention taken in conjunction with the accompanying drawings and descriptive matter in which there is illustrated a preferred embodiment of the invention.

DETAILED DESCRIPTION OF THE INVENTION

Figure 1:
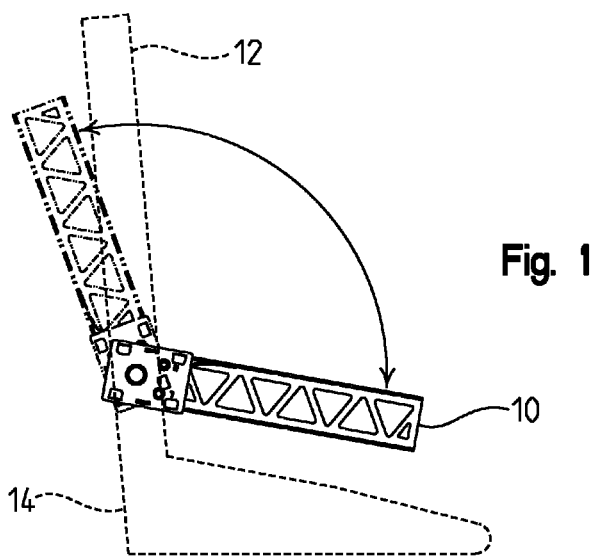
FIG. 1 is a side plan view of a chair with the adjustable armrest of the invention attached to the back support element indicating the range of movement of the armrest.

The adjustable armrest of the invention includes an armrest 18 for attaching to a back support element 12 of a furniture piece 14 so that the angle of the armrest relative to the back support element may be incrementally adjusted between a lower position and an upper position, as the example of FIG. 1 illustrates. The novel adjustable connecting device 20 defines the broadest aspect of the invention. The device may be used in connection with any furniture piece where incremental adjustment of one part relative to another is desirable. Examples may include an armrest along the lines of the one shown in the figures, which may be connected to the back support of a chair, or the adjustable connecting device 20 may have application with respect to recliners and lounges, for example, where a pivot connection between a seat and back support is pivotable utilizing the adjustable connecting device of the invention.

Referring to FIGS. 2-5, the new adjustable armrest 10 includes a housing defined by an inside and an outside bracket wall 22, 24. Bores 21, 23 in the walls support a pivot pin 30 with a gear 40 so that the armrest is pivotable on the pin. A ratchet 50 with a pawl 51 is pivotably connected to the armrest. The ratchet 50 is also configured so that the pawl 51 may engage the gear to define incremental ratcheting movement of the armrest 10 on the pin 30 when the armrest is pivoted in one direction. There is also provided a cam ring 70 adapted to selectively rotate and engage the gear 40 with upward movement of the armrest. A cam surface 72 contacts a portion of the ratchet 50 and pivots the ratchet clear of engagement with the gear teeth 42 when the armrest is pivoted in a downward direction.

Figure 2:
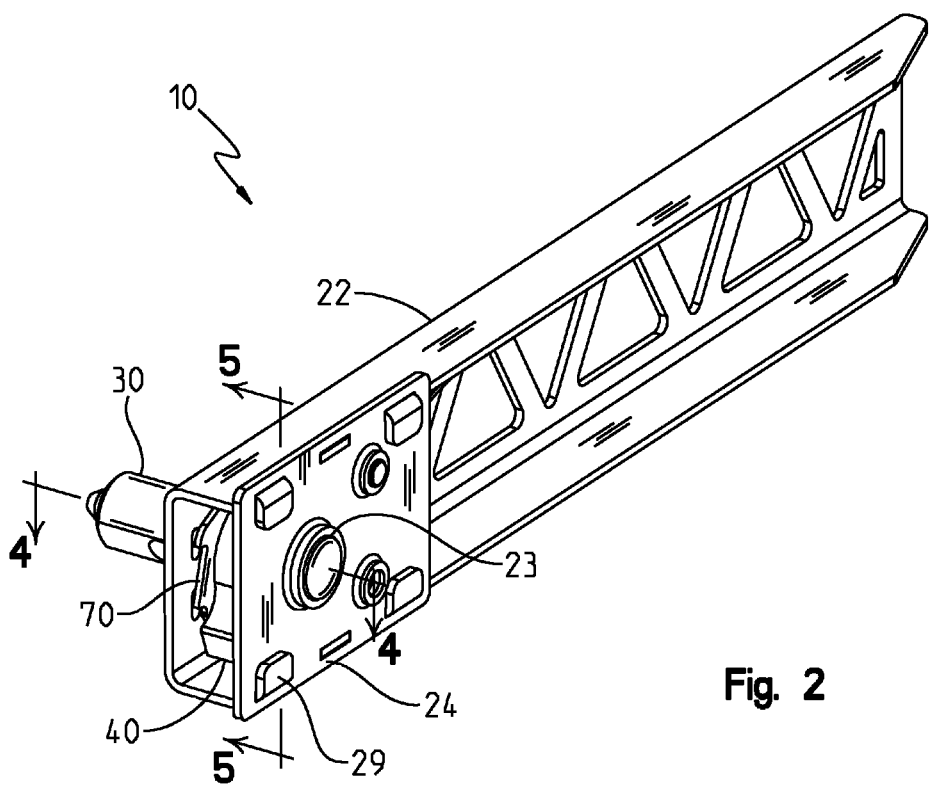
FIG. 2 is an isometric view of the adjustable armrest device of the invention.

More specifically, in one embodiment, the armrest has a housing defined by inside and outside bracket walls 22, 24 that come together and sandwich the pivot pin 30, gear 48, cam 70 and ratchet 50, as shown in FIG. 2. The brackets are preferably formed from a rigid material such as metal, metal alloys, plastic or the like. In the embodiment illustrated, the brackets are stamped tube and plate high strength steel having a steel gauge of between about 12 and 14, which makes the armrest strong and yet no heavier than existing devices. The brackets are stamped and/or machined to possess the requisite bores 21, 23 for left and right armrests and secured together using known means such as deformed fasteners 29.

Figure 3:
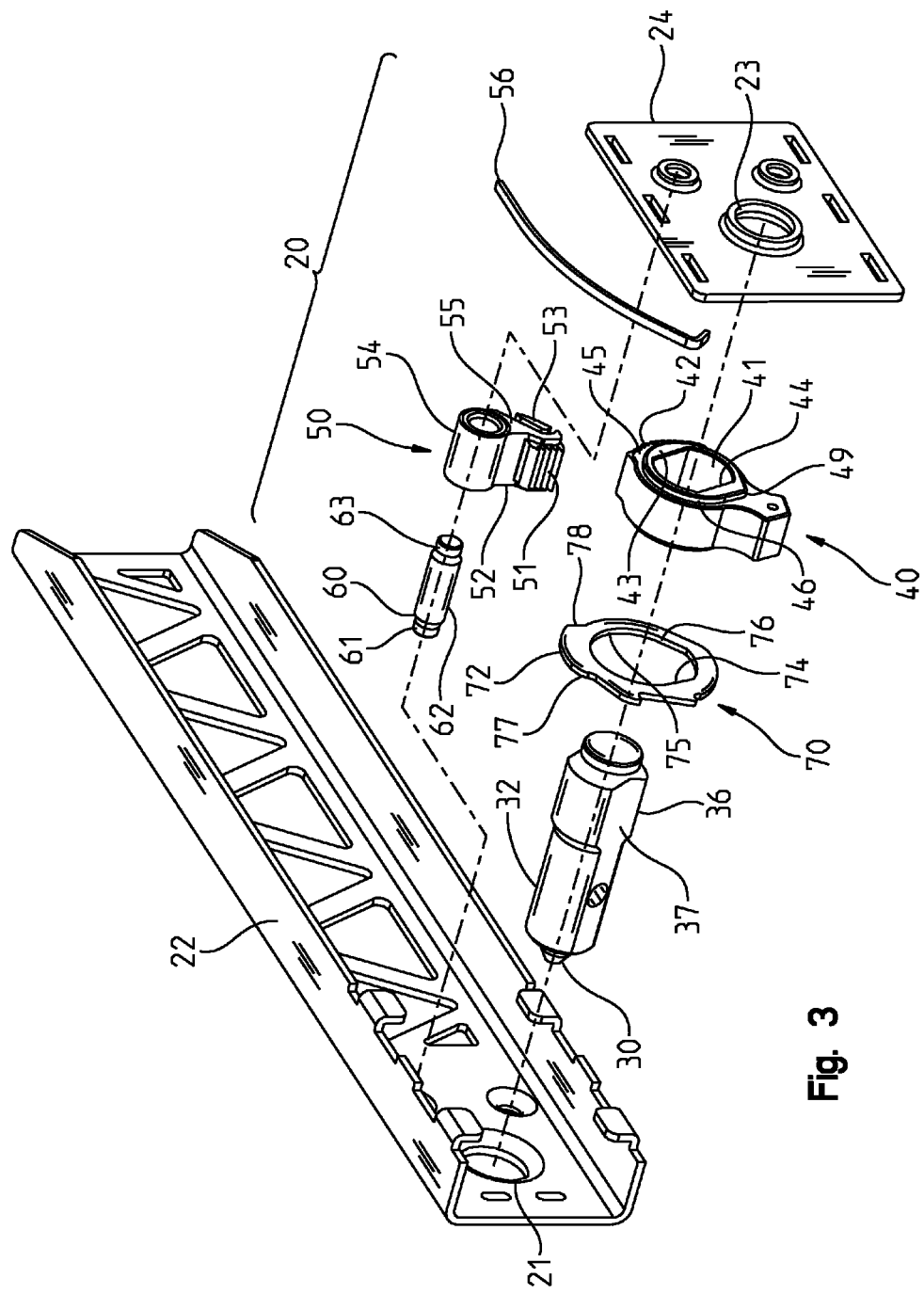
FIG. 3 is an isometric exploded view of the adjustable armrest device shown disassembled.
Figure 4:
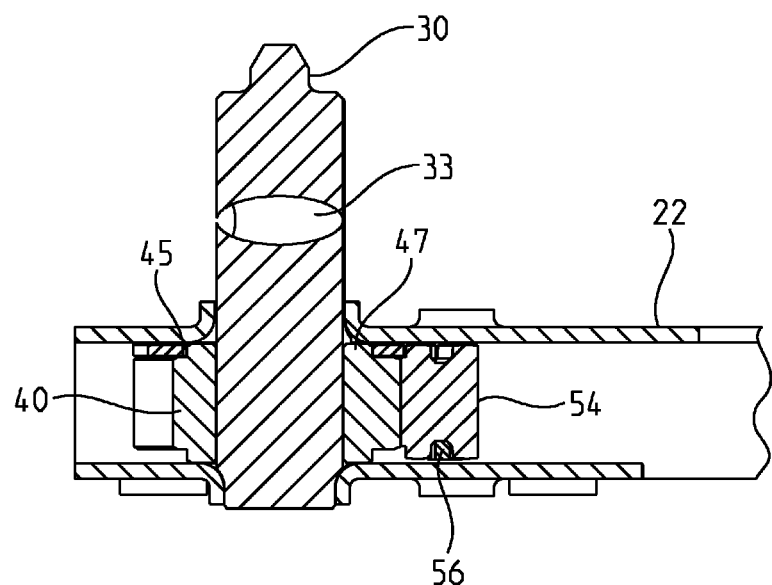
FIG. 4 is a cross sectional view of the adjustable armrest taken along lines 4-4 of FIG. 2.
Figure 5:
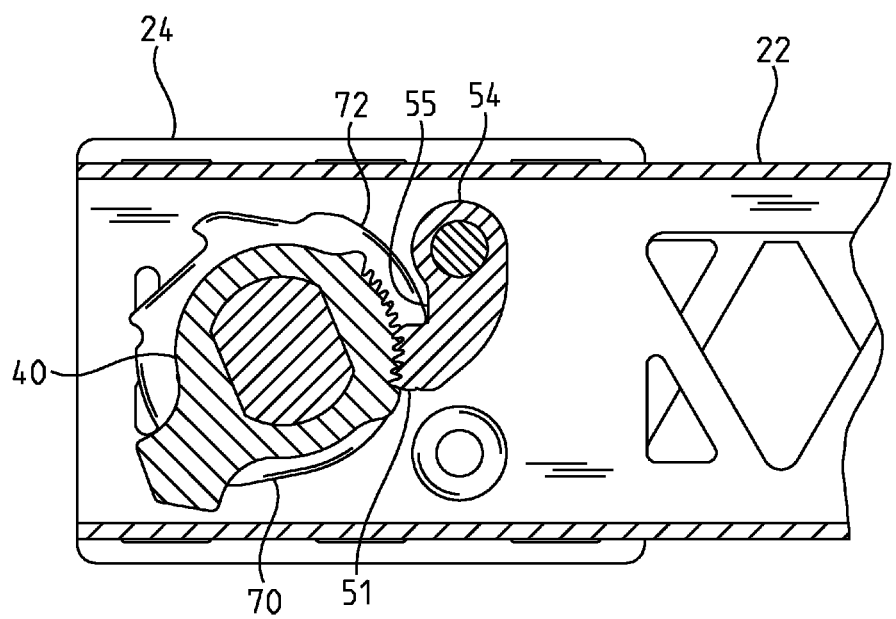
FIG. 5 is a cross sectional view of the adjustable armrest taken along lines 5-5 of FIG. 2.
Figure 6A:
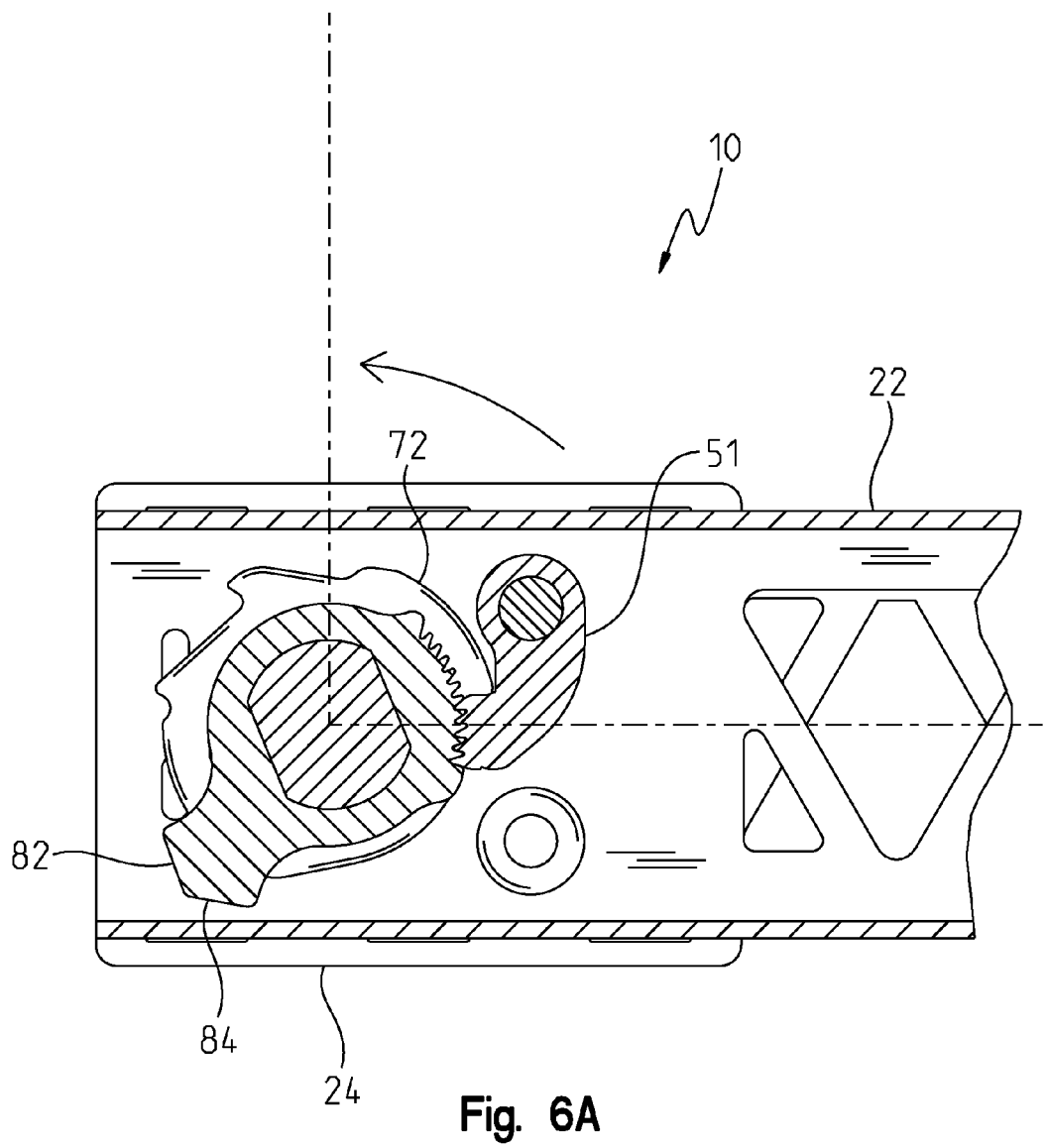
FIG. 6A is a cross section view like FIG. 5. The phantom lines represent the horizontal and the vertical. The arrow shows the direction the armrest pivots.
Figure 6B:
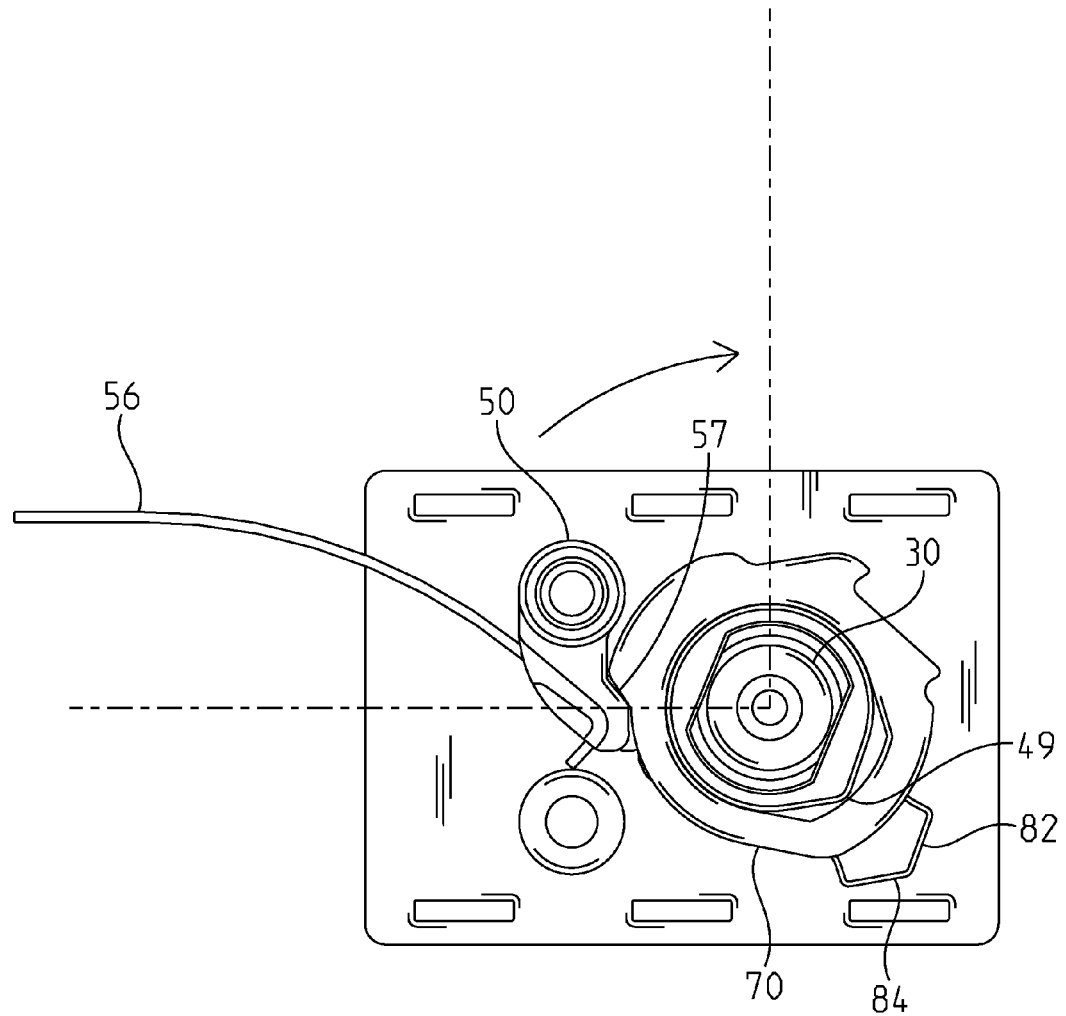
FIG. 6B is a side plan view of the opposite side of the adjustable armrest device of FIG. 6A with the inside bracket removed.
Figure 7A:
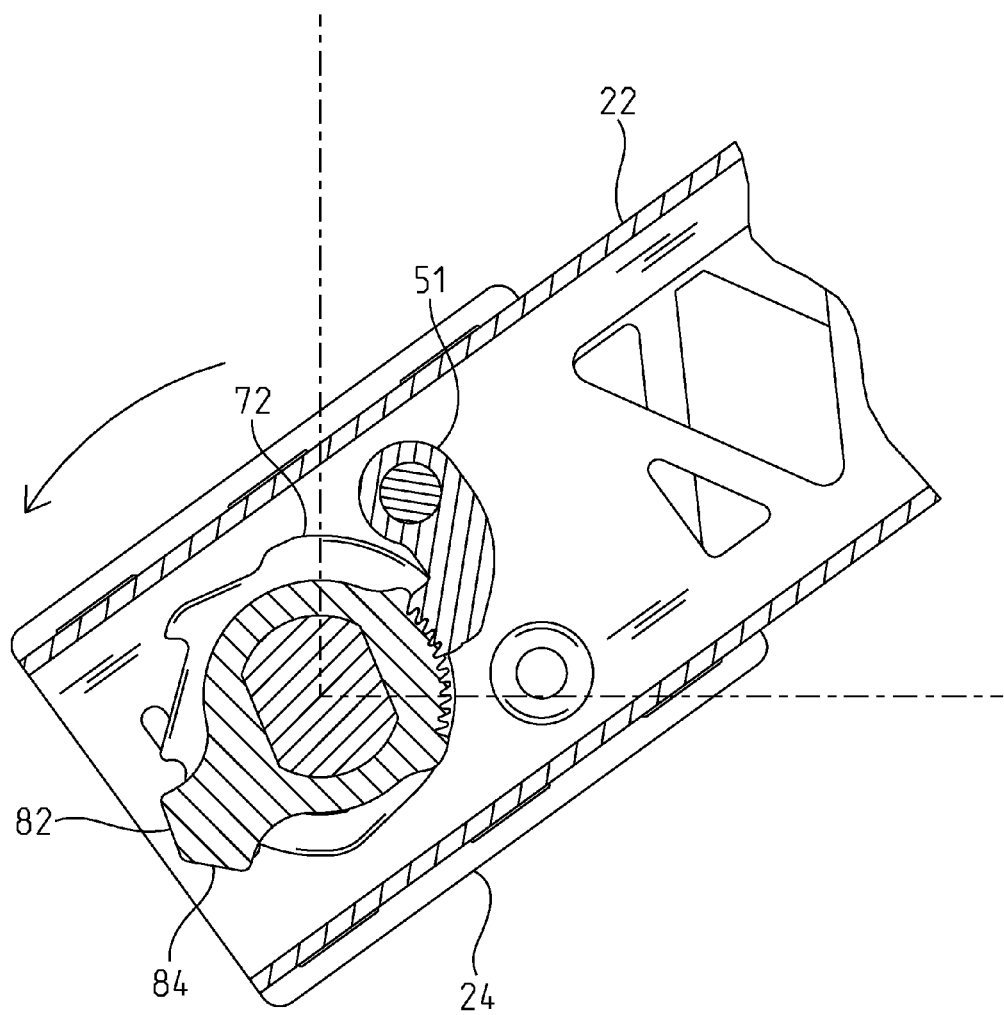
FIG. 7A is a cross section view like FIG. 5 showing movement of the armrest toward the upper position illustrating the ratchet teeth engaging the detents.
Figure 7B:
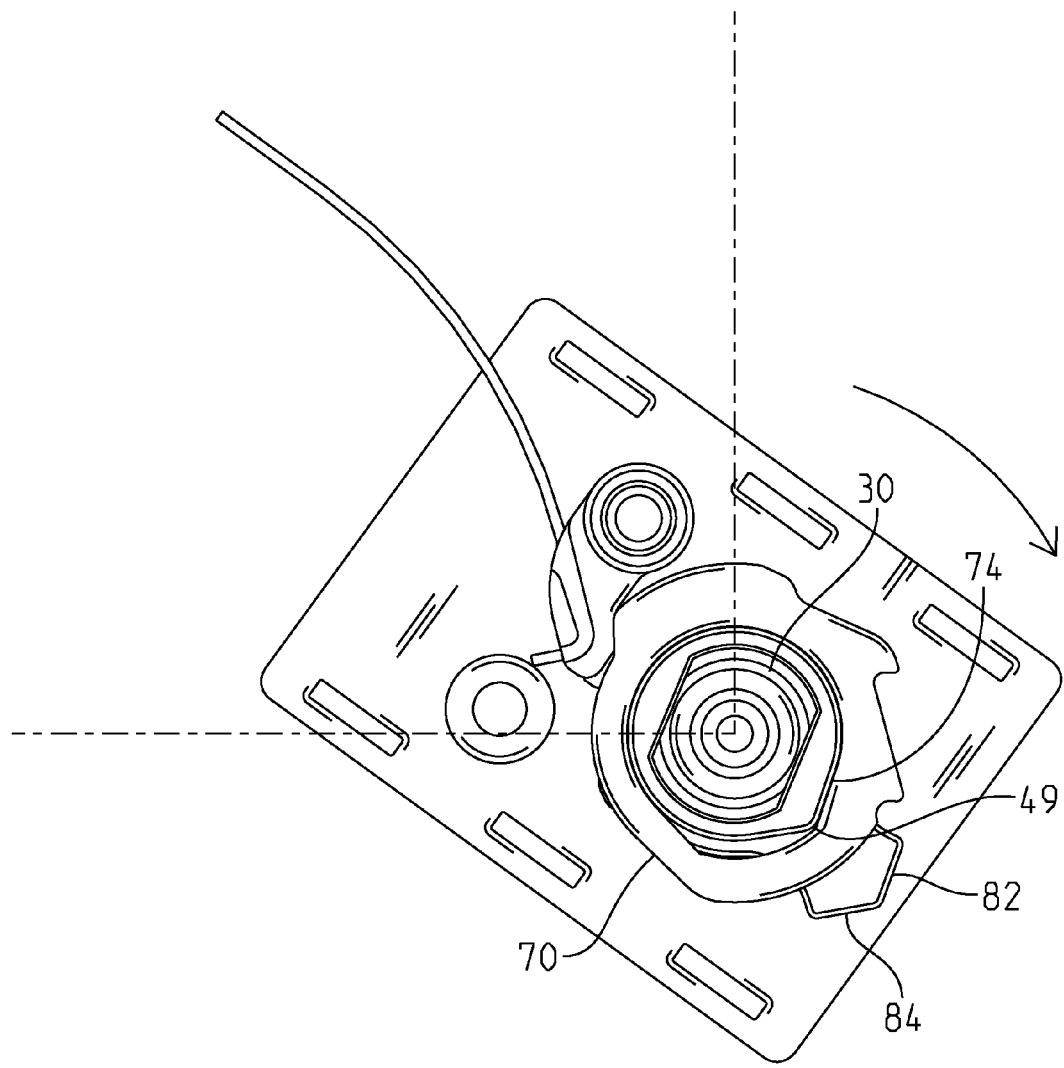
FIG. 7B is a side plan view of the opposite side of the adjustable armrest device of FIG. 7A with the inside bracket removed.

As best shown in FIGS. 3-4, the pivot pin 30 includes a shaft 32 with a cross bore 33 extending through it for receiving a fastener such as a screw or pin to secure the pivot pin 30 to the back support element of the furniture piece. In one embodiment, the angle of the cross bore, that is, the angle at which the armrest 10 is required with respect to the horizontal to insert a fastener into the bore 33 is between twenty and twenty-five degrees (20°-25°). In the preferred embodiment, an eight millimeter alloy steel, 10.9 Grade or equivalent bolt is utilized as a fastener and, measured 250 mm forward of the fastener center line, will support vertical and horizontal load bearing forces on the order of 1,400-1,600 N and 2,300-2,500 N, respectively, in applications where persons grasp, sit or lean on the armrest. The result is improved torsion force support and load-bearing capabilities, which are the primary reasons the life of conventional armrests and their connections to a furniture piece become worn and fail.

The shaft of the pin includes an enlarged head 36 having opposite plan sides 37. A gear 40 is positioned on the pin. The gear has teeth 42 extending across its entire width to define detents. The gear includes an upper position stop 82 and a lower position stop 84 each extending outwardly from the gear 40. Gear 40 has an opening 41 with opposite plan sides 44 for snuggly receiving the head 36. The opening is framed by an upstanding portion 46 with a front face 43. When assembled between brackets 22, 24, there is a minimal gap to insure tree rotation when the gear is on the pin. The inner side 45 of the gear also includes an upstanding portion 47, as illustrated in FIGS. 3-4. The upstanding portions have opposite sides that converge to a point 49.

A ratchet 50 with a pawl 51 is pivotably connected by a ratchet pin 60 to the armrest between the brackets 22, 24 so that the ratchet is carried by the armrest 10. In one embodiment, the ratchet 50 is pivotably connected to the interior bracket 22 by a ratchet pin 60 that resides in the cylinder 54. The pawl has a tail with teeth 52 that extend across the entire width of the tail at one end for engaging the teeth 42 of the gear 40 to define incremental ratcheting movement of the armrest 10 when the armrest is pivoted in one direction on the pivot pin 30. The tail of the ratchet extends from a generally hollow cylinder portion 54 at its other end. The ratchet includes a central section 55 between the ends connecting the cylinder portion and tail, and which has raised ledges 57 on both sides of the central section. Each of the ledges has a cutout 53 for receiving a portion of a tension spring 56, which is operatively arranged to constantly urge the pawl 51 of the ratchet into engagement with the gear 40.

With reference to FIGS. 3-4, the outer diameter of the pin 60 is smaller on its ends 61, 63 than it is at its central portion 62 such that the bores in the interior and exterior brackets may receive the ends of the pin 60 and securely support the ratchet 50 so that the pawl 51 may engage the gear 40 to define incremental ratcheting movement of the armrest on the pin when the armrest is pivoted in one direction, as described below. Providing dual ledges 57 on both sides of the central section 55 of the ratchet 50 means that the same ratchet can be installed in a left armrest or a right armrest. This saves cost and mart hours since the pieces are interchangeable and do not have to be matched with a particular orientation during high volume manufacture and assembly of the armrest 10.

In one embodiment, the cam 70 is a closed ring with a central opening 75. The central opening of the cam has an interior surface that is shaped to include a substantially linear segment having at least two substantially straight sides 74, 76. The ring may be formed from the same material as the other parts described above. The cam ring 70 has an exterior cam surface 72 that cams the ratchet 50 clear of engagement with the gear 40 when the armrest 10 is pivoted in one direction. This is done when the side ledge 57 of the ratchet 50 rides along the exterior camming surface 72 of the cam upon pivoting the armrest in the downward direction, as described below.

Referring to FIGS. 6A-10B illustrate movement of the new armrest device 10. The novel design is characterized in that the interior surface of the cam ring 70 is adapted to selectively rotate and engage the gear 40 and hence effect the rotation desired. When the cam ring 70 is positioned on the pivot pin 30, the circular side of the upstanding portion 46 of the gear 40 is bound by the two substantially straight sides 74, 76 of the interior surface of the cam ring, as shown in FIGS. 6B, 7B, 8B, 9B and 10B. Thus, upon pivoting the armrest 10, the gear 40 rotates, and one of the opposite sides that converge to form the point 49 of the upstanding side of the gear 40 contacts one of the straight sides 74 (FIG. 7B) of the interior of the cam ring 70. With the cam ring 70 held in this static position, the armrest may be pivoted upward incrementally, i.e., ratcheting from a lower position to an upper position within the detents defined by the teeth 42, 52. In one embodiment, the degree of movement between each tooth, and detent, is between about two and ten degrees (2°-10°). The preferred degree of movement is approximately six degrees (6°) between each tooth. Hence, in accordance with the embodiment shown in the drawings, the armrest may be moved approximately thirty to forty-five degrees (30°-45°) within the ratcheting range, which is characterized by engagement of the gear teeth with the ratchet teeth 52. More preferably, the movement within the detents is between the lower position, which is approximately horizontal relative to the seat, and the upper position, which, as illustrated in FIGS. 1, 8A and 8B, is beyond parallel with the back support element of the furniture piece.

Figure 8A:
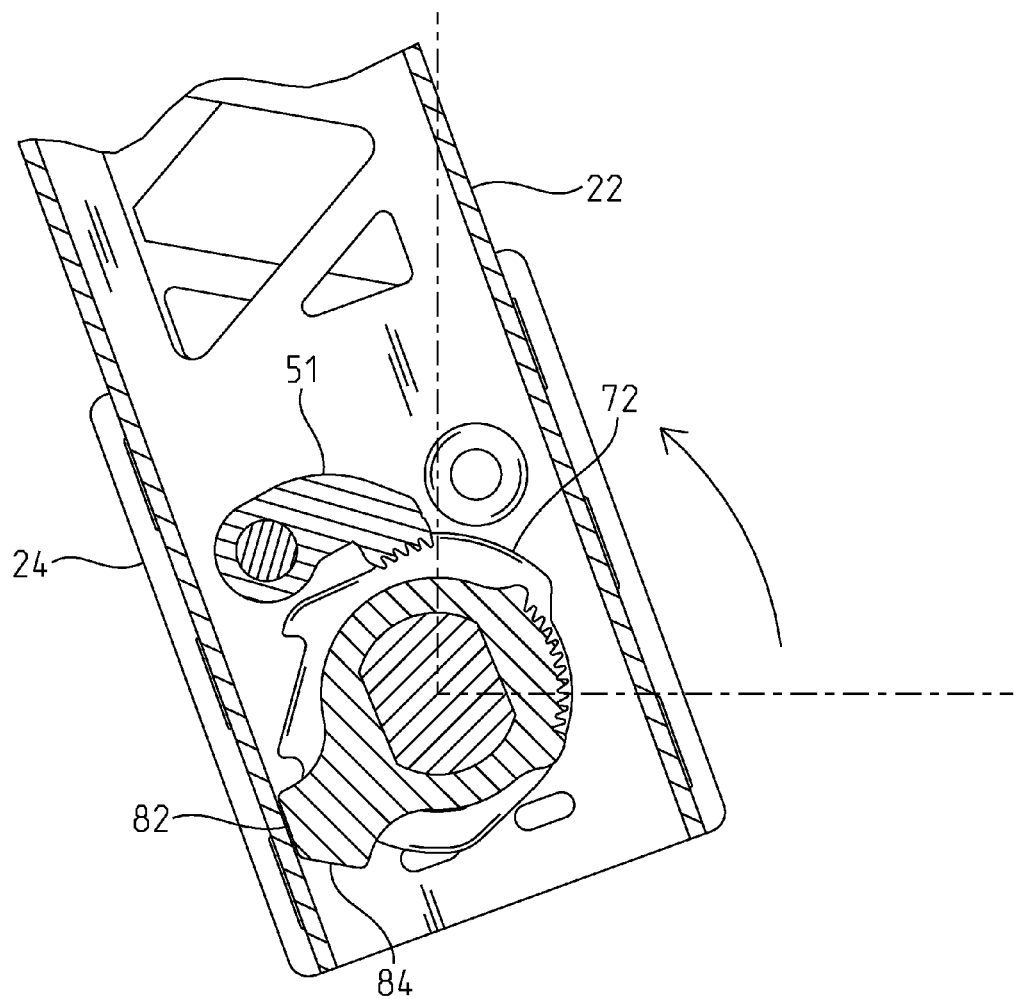
FIG. 8A is a cross section view like FIG. 5 showing the armrest in the upper position, beyond parallel with the back support element, with the lower position stop of the gear shown abutting the interior bracket wall.
Figure 8B:
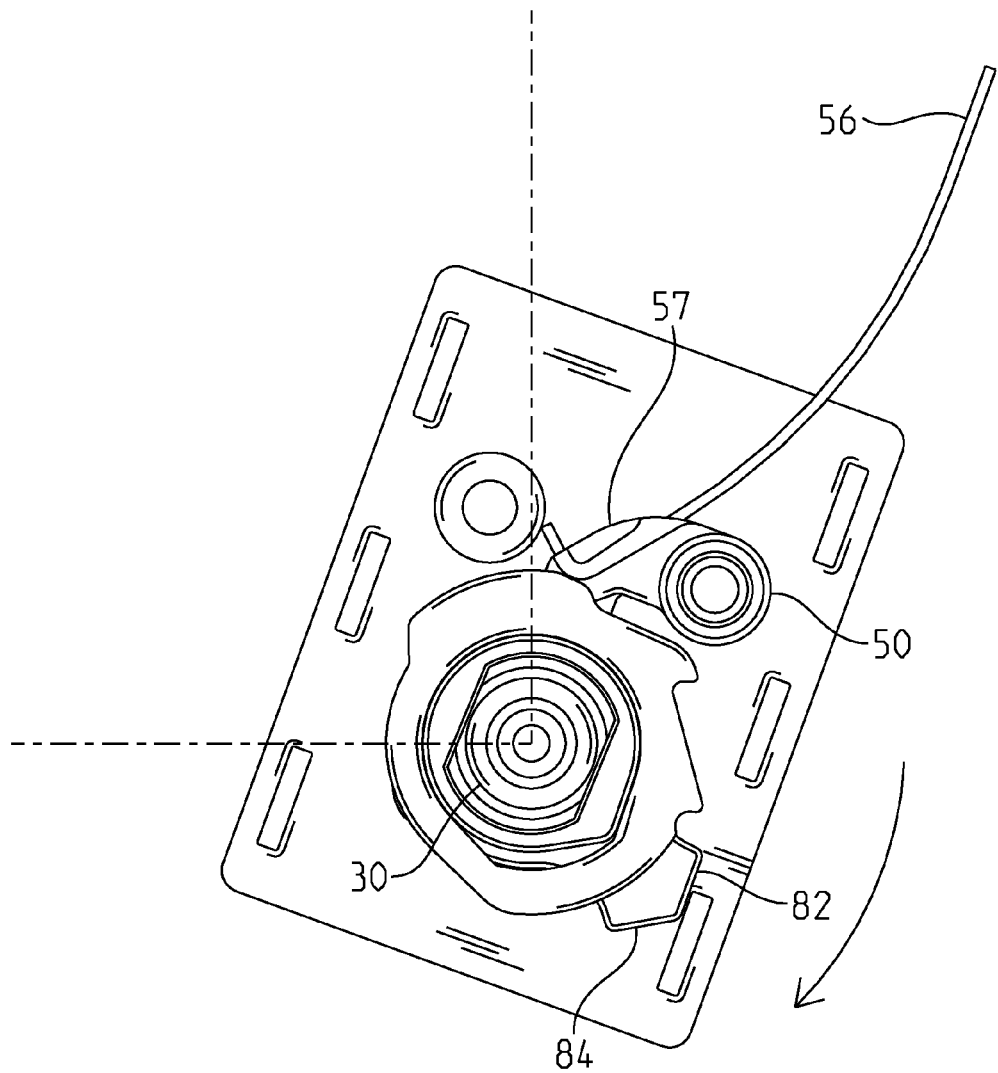
FIG. 8B is a side plan view of the opposite side of the adjustable armrest device of FIG. 8A with the inside bracket removed showing the ledge of the central section of the ratchet riding along the cam surface of the ring.
Figure 9A:
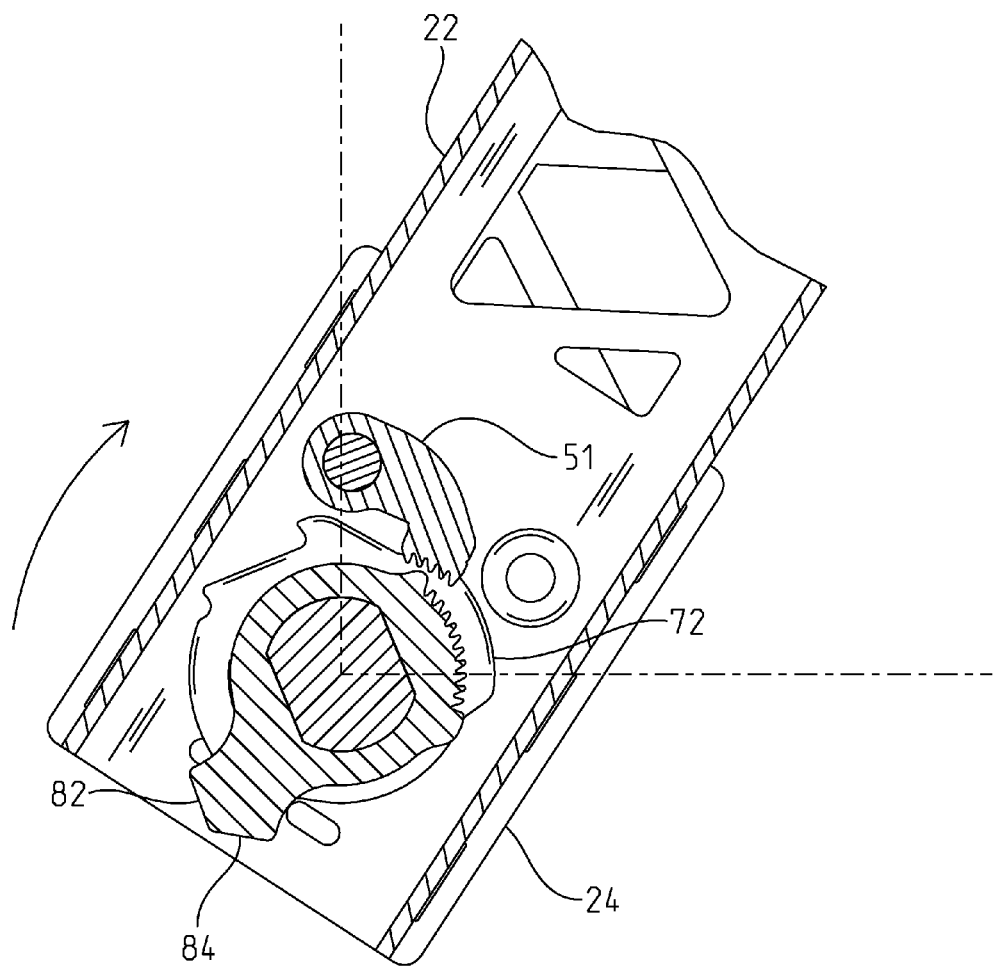
FIG. 9A is a cross section view like FIG. 5 showing movement of the armrest toward the lower position illustrating the ratchet teeth clear of engagement with the detents of the gear teeth.
Figure 9B:
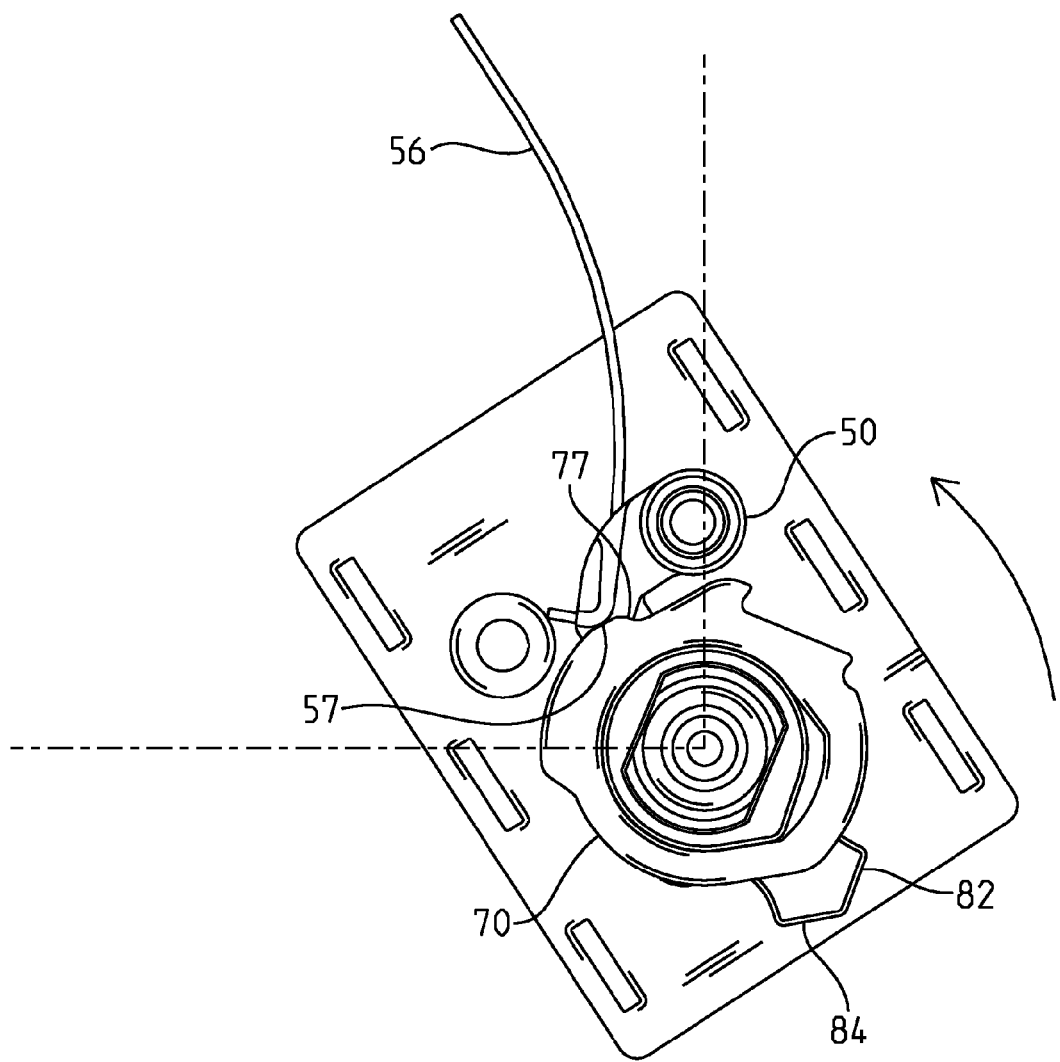
FIG. 9B is a side plan view of the opposite side of the adjustable armrest device of FIG. 9A with the inside bracket removed showing the ledge of the central section of the ratchet riding along the cam surface of the ring.

When the armrest 10 is moved upward beyond the upper most detent position, the raised ledge 57 of the ratchet 50 rides atop the external cam surface 72 of the cam 70 thus pivoting the ratchet at pivot pin 60 so that the teeth 52 of the pawl 51 are clear of engagement with the teeth 42 of the gear 40. Such upward movement of the armrest may continue until the ratchet 50 contacts the cam's upper stop 78 (FIG. 3) and the armrest is in its upper position, as shown in FIGS. 8A-8B. Thus, in the upper stop position (FIGS. 8A-8B), increased [horizontal) or (vertical)] lever loads, that is, loads displaced on the end of the armrest, for example, may be born by the armrest because the pin 30, cam ring 70 and gear 40 are hard stopped as a single unit against the plate steel of the armrest bracket, as shown in FIGS. 8A-8B.

Figure 10A:
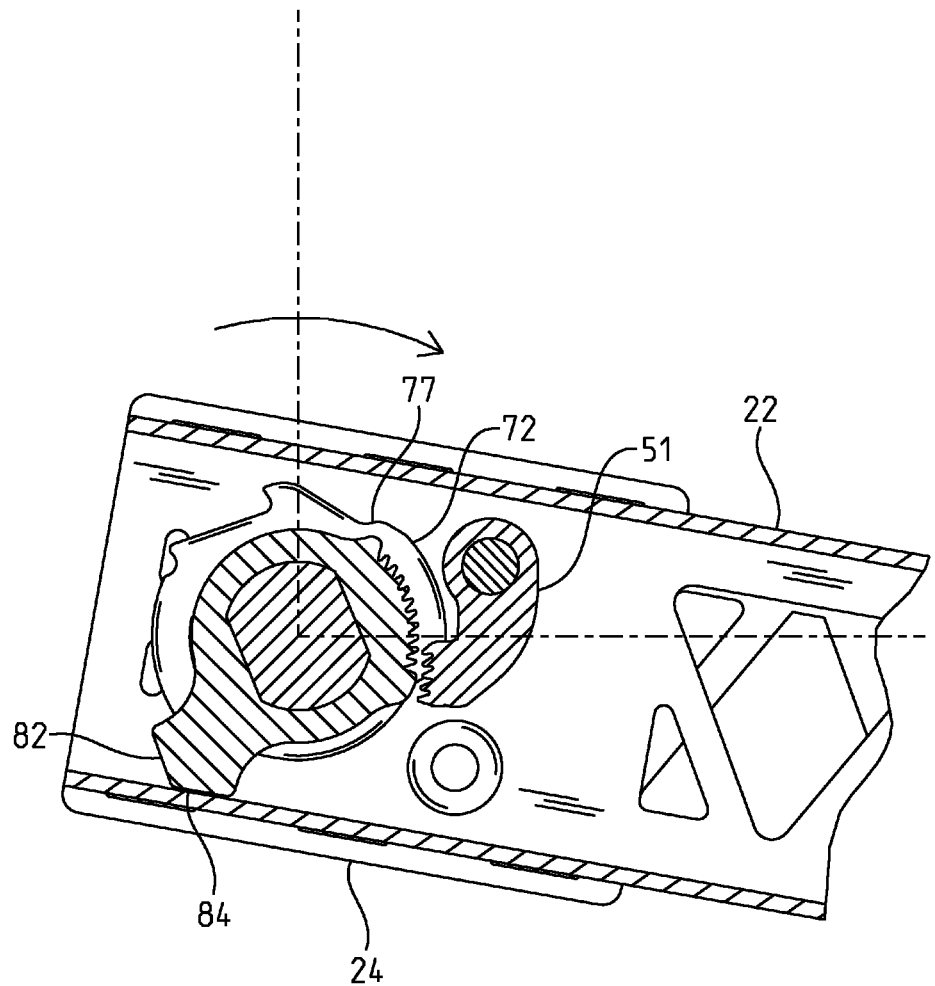
FIG. 10A is a cross section view like FIG. 5 showing the armrest in the lower position, beyond the horizontal, with the upper position stop of the gear shown abutting the interior bracket wall.
Figure 10B:
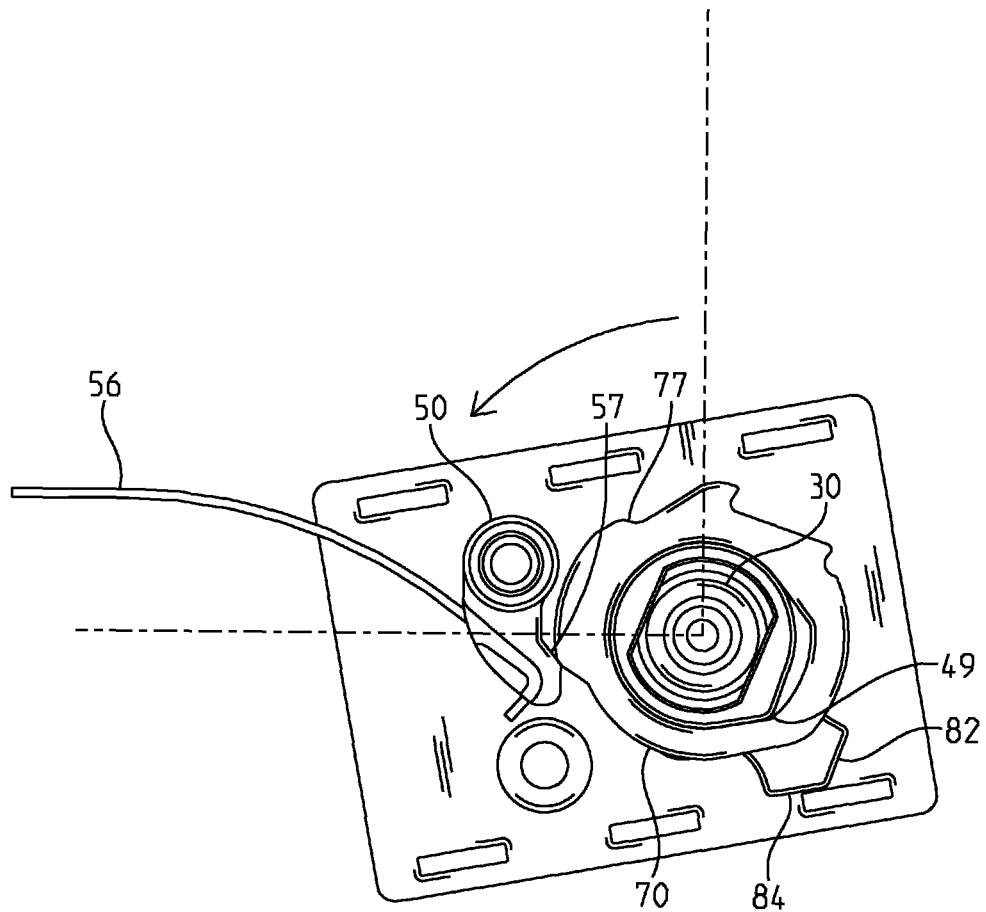
FIG. 10B is a side plan view of the opposite side of the adjustable armrest device of FIG. 10A with the inside bracket removed.

In the other direction, FIGS. 9A-10B, the cam ring 70 is rotated in the downward direction until the other of the sides of the upstanding portion 46 of the gear that converges to form the point 49 contacts the straight side 76 of the cam ring 70. With the cam in this position, the armrest may be lowered, and the raised ledge 57 of the ratchet 50 rides atop the external cam surface 72 of the cam ring 70 thus pivoting the ratchet so that the teeth 52 of the pawl are clear of engagement with the gear 40. Such downward movement of the armrest may continue until the ratchet descends the front slope portion 77 of the cam surface 72 and contacts the gear's lower stop 84, as shown in FIG. 10B. In a manner characterized similarly to that when the armrest is in the upper hard stop position, except that the load bearing is in the opposite, or [(horizontal) or (vertical)] attitude, substantially greater loads may be born by the armrest as the gear comes to bear against the plate steel of the armrest bracket.

In this position, illustrated in FIGS. 1, 8A and 8B, the armrest is preferably not greater man negative five degrees (−5°) from horizontal, and in one embodiment, the lower most position is not greater than negative ten degrees from horizontal (−10°). Like the brackets 22, 24, the pivot pin 30, gear 40, ratchet 50, pin 60 and cam 70 are each formed from rigid material such as steel, metal alloy, plastic or the like. In one embodiment, these parts are machined from steel. Since there are few moving parts, the cost of production is lower when compared to conventional adjustable armrests, and the selective rotation of the new cam and gear design result in the parts locking together as a single load-bearing unit, which makes the new armrest dependable and longer lasting.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Thus, it is understood that it is desirable to protect all the changes and modifications that come within the spirit of the invention.

What is claimed is:

1. An adjustable connecting device for connecting an armrest to a back support element of a furniture piece so that the angle of the armrest relative to the back support element may be incrementally adjusted between an upper position and a lower position, the device comprising:

a pivot pin with one end adapted to be connected to the back support element so the armrest is pivotable on the pin;

a gear on the pin, said gear having a face with an upstanding portion, said gear also having exterior teeth;

a cam ring on the pin with an interior surface and an exterior cam surface, a ratchet carried by the armrest having a cylinder portion at a pivot end, a tail with teeth at another end, and a central section between said ends, opposite lateral sides of said central section of the ratchet each has a ledge for engagement with the exterior cam surface of the cam ring for pivoting the ratchet upon rotation of the armrest; and a tension spring for constantly urging the tail of the ratchet in a direction toward engagement with the gear.

2. A device according to claim 1, wherein the gear, cam ring, ratchet and tension spring are housed between brackets.

3. A device according to claim 2, wherein opposite sides of said gear each has a face with a respective upstanding portion for engaging the interior surface of the cam ring to rotate the ring, the gear comprising an upper position stop and a lower position stop each extending outwardly from the gear.

4. A device according to claim 1, wherein opposite sides of said gear each has a face with a respective upstanding portion for engaging the interior surface of the cam ring to rotate the ring.

5. A device according to claim 1, wherein the ratchet teeth extend across an entire width of the ratchet and engage detents between the gear teeth in response to pivoting the armrest from the lower position in a direction toward the upper position to define movement of the armrest in increments of between two and ten degrees (2°-10°), said gear teeth extend across an entire width of the gear.

6. An adjustable armrest for attaching to a back support member of a furniture piece so that the angle of the armrest relative to the back support element may be incrementally adjusted between an upper position and a lower position, the armrest comprising:

a housing with an inside and an outside bracket wall, each of the walls has a bore formed there through;

a pivot pin in the housing supported by each of the bores, the pivot pin having one end adapted to be connected to the back support element so the armrest is pivotable on the pin;

a gear positioned on the pin, said gear having teeth extending across the entire width of the gear to define detents, said gear comprising an upper position stop and a lower position stop;

a cam ring positioned on the pivot pin with an interior surface for selective rotational engagement with the gear, and an exterior cam surface, the interior of the ring receives an upstanding portion formed on a side face of the gear, said interior surface of the cam comprising a linear segment with sides, each of the sides respectively contacting opposite converging sides of the upstanding portion of the gear to define an upper stop position and a lower stop position;

a ratchet earned by the armrest having a pivot at one end, a tail with ratchet teeth at another end, and a central section between the two ends, said central section having a ledge for engagement with the exterior cam surface of the ring to pivot the ratchet upon rotation of the armrest, said ratchet teeth extending across the entire width of the tail; and a tension spring operatively arranged in the housing for constantly urging the tail of the ratchet in a direction toward engagement with the gear;

wherein the ratchet teeth engage the detents between the gear teeth in response to pivoting the armrest from the lower position in a direction toward the upper position to define movement of the armrest in increments of between two and ten degrees (2°-10°).

7. An armrest according to claim 6, wherein said incremental movement of the armrest between the lower position and the upper position, which is characterized by said teeth and detent engagement, defines a range between thirty and forty-five degrees (30°-45°).

8. An armrest according to claim 6, wherein the exterior cam surface of the ring includes an indention that receives a locking peg on the gear for stopping rotation of the cam ring relative to the gear and for supporting load displaced on the armrest when the armrest is in the upper stop position.

9. An armrest according to claim 8, wherein opposite sides of said gear each has a face with a respective upstanding portion for engaging the interior surface of the cam ring to rotate the ring.

10. An armrest according to claim 9, wherein opposite sides of said central section of the ratchet each has a ledge for engagement with an exterior cam surface of a cam ring for pivoting the ratchet upon rotation of the armrest.

* * * * *